United States Patent
Cuberovic (10) Patent No.: US 9,924,418 B1
(45) Date of Patent: Mar. 20, 2018

(54) AUTOMATIC DELETION OF INACCURATE NEIGHBOR RELATIONS

(71) Applicant: Verizon Patent and Licensing Inc., Arlington, VA (US)

(72) Inventor: Dragan Cuberovic, Flower Mound, TX (US)

(73) Assignee: Verizon Patent and Licensing Inc., Basking Ridge, NJ (US)

( * ) Notice: Subject to any disclaimer, the term of this patent is extended or adjusted under 35 U.S.C. 154(b) by 0 days.

(21) Appl. No.: 15/338,986

(22) Filed: Oct. 31, 2016

(51) Int. Cl.
*H04W 36/00* (2009.01)
*H04W 84/04* (2009.01)

(52) U.S. Cl.
CPC ...... *H04W 36/0061* (2013.01); *H04W 84/042* (2013.01)

(58) Field of Classification Search
CPC .................. H04W 36/0061; H04W 84/042
USPC ......................................................... 455/438
See application file for complete search history.

(56) References Cited

U.S. PATENT DOCUMENTS

| | | | | |
|---|---|---|---|---|
| 8,630,648 B2* | 1/2014 | Rune | ............... | H04J 11/0093 455/436 |
| 9,326,196 B1* | 4/2016 | Sitaram | ............ | H04W 36/0061 |
| 9,510,249 B2* | 11/2016 | Suzuki | ............. | H04W 36/0055 |
| 2014/0073304 A1* | 3/2014 | Brisebois | ............. | H04W 24/02 455/418 |

* cited by examiner

*Primary Examiner* — Shahriar Behnamian (57) ABSTRACT

A method may include receiving a local identifier associated with a cell of a cellular network. The method may include identifying a stored global identifier corresponding to the local identifier based on a data structure. The method may include determining, based on the data structure, that the stored global identifier is not verified as associated with the local identifier. The method may include causing a received global identifier to be obtained based on determining that the stored global identifier is not verified as associated with the local identifier. The method may include determining that the stored global identifier matches the received global identifier to verify the stored global identifier. The method may include causing a handover to the cell based on determining that the stored global identifier matches the received global identifier.

20 Claims, 6 Drawing Sheets

AUTOMATIC DELETION OF INACCURATE NEIGHBOR RELATIONS

BACKGROUND

A cellular network is a communication network in which the last link is wireless. The cellular network is distributed over land areas, called cells, which are served by at least one cell site or base station. The base station provides the cell with network coverage to facilitate communication of audio, video, text, and/or other traffic among user devices. In some cases, a first base station may have better signal strength or quality with regard to the user device than a second base station. In such cases, a serving base station of the user device may initiate a handover from the serving base station to the first base station.

DETAILED DESCRIPTION OF PREFERRED EMBODIMENTS

The following detailed description of example implementations refers to the accompanying drawings. The same reference numbers in different drawings may identify the same or similar elements.

User devices may communicate with a wireless network (e.g., 3G network, 4G network, LTE network, or the like) via base stations (e.g., an eNodeB, a home NodeB, a microcell base station, a picocell base station, a femtocell base station, or the like). The base stations may provide cells to which a user device connects in order to receive and transmit data.

A cell may be identified by a global identifier (e.g., a cell global identity (CGI), an evolved Universal Mobile Telecommunications System (E-UMTS) CGI (ECGI), a physical address, or the like) and by a local identifier (e.g., a physical cell identity (PCI), a network address, or the like). The local identifier may be smaller and/or more compact than the global identifier in order to conserve network resources, but also may be more limited in value range than the global identifier. For example, in an LTE network, there may be 504 possible PCI values, and an effectively unlimited quantity of possible ECGI values.

A user device may be handed over from a first cell or base station (e.g., a serving cell) to a second cell or base station (e.g., a neighbor cell) based on relative signal strengths of the first cell or base station and the second cell or base station. For example, the serving cell may be associated with a primary component carrier of the user device, whereas a neighbor cell may be any cell other than the serving cell (e.g., a cell that is associated with a secondary component carrier of the user device).

In some cases, a user device may identify cells based on the local identifiers associated with the cells. For example, the user device may query a base station that provides a cell for a local identifier associated with the cell based on detecting a signal, associated with the cell, that satisfies a signal strength or signal quality threshold.

In some cases, a cellular network device (e.g., a self-organizing network (SON) system, a serving base station of a user device, or the like) may need to obtain a value of the global identifier to perform the handover. For example, the cellular network device may need the global identifier to route traffic associated with the user device to the new cell/base station via the backhaul network. In such a case, the cellular network device may cause the user device to obtain the global identifier associated with the cell to which the handover is to be performed.

The SON system may populate a data structure (e.g., a neighbor relation table) that identifies the local identifiers of cells and the global identifiers of the cells in order to permit management of user device handovers when the user device only obtains the local identifier. When the SON system determines that a particular local identifier has not been added to the data structure, the SON system may cause the user device to obtain a corresponding global identifier for the cell. Populating the data structure may expedite the process of handing over user devices from one cell to another cell and may reduce network overhead. This process of querying the base station and populating the data structure may be called automated neighbor relation (ANR).

In some cases, there is a non-zero chance of a user device being in a coverage area of two cells that have the same local identifier. For example, a particular location may be associated with (e.g., covered by) two or more different cells provided by a first base station and a second base station. If the neighbor relation table is populated with a global identifier associated with the second base station, the user device may automatically be handed over to the second base station. This may cause handover and/or service issues when the second base station is associated with poorer coverage than the first base station. For example, coverage of the cell of the first base station may have been temporarily impeded, and the user device may have accordingly obtained the global identifier associated with the second base station. In this case, a network technician may have to manually detect such issues based on handover failure records, or the like, which is time-intensive, inefficient, and error prone.

Implementations described herein may add a deletion and correction process to the automated neighbor relation process. When a new neighbor relation (i.e., a new local identifier-global identifier pair) is received, an entry associated with the new neighbor relation may be added to the neighbor relation table and verification information (e.g., a verification flag) for the new neighbor relation may be set to a "verified" value. This verification information may later be set to an "unverified" value (e.g., based on a timer). When the local identifier is received from a user device (e.g., based on a measurement report from the user device to cause a handover), implementations described herein may cause the user device to obtain a received global identifier based on the verification flag. Implementations described herein may compare the received global identifier and the stored global identifier. When the received global identifier matches the stored global identifier, a handover of the user device may be initiated and the verification flag may be set to a "verified" value. When the received global identifier does not match the stored global identifier, the entry in the neighbor relation table associated with the new neighbor relation may be deleted and/or a different action may be performed, so that a correct local identifier can be identified and a new neighbor relation added accordingly.

In this way, incidents of inaccurate neighbor relations are reduced, which improves network performance and reduces erroneous or failed handovers. Additionally, inaccurate neighbor relations are automatically identified and corrected, which reduces reliance on humans to identify neighbor relations. Furthermore, because implementations described herein are performed based on checking the verification flag during the handover/measurement process of a user device in the field, real-time identification of incorrect neighbor relations based on field conditions is possible, which may be difficult or impossible for a human to perform. Moreover, network performance is improved by not inadvertently handing over a user device to a cell that would provide inadequate performance for the user device. Also, user device resources and network resources are conserved by avoidance of degraded user device connection conditions, which would result in dropped data.

Figure 1A:
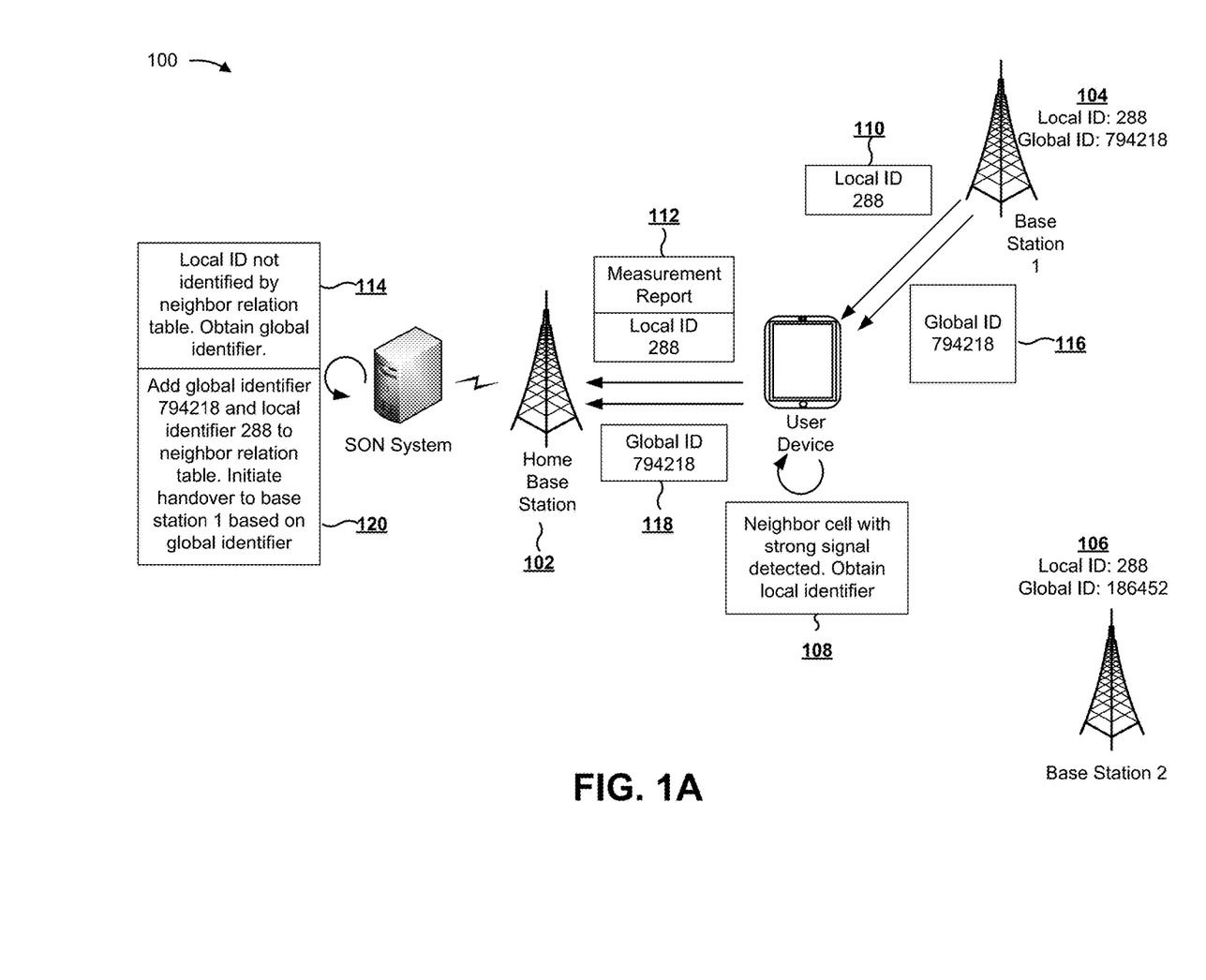
FIGS. 1A-1C are diagrams of an overview of an example implementation described herein.
Figure 1B:
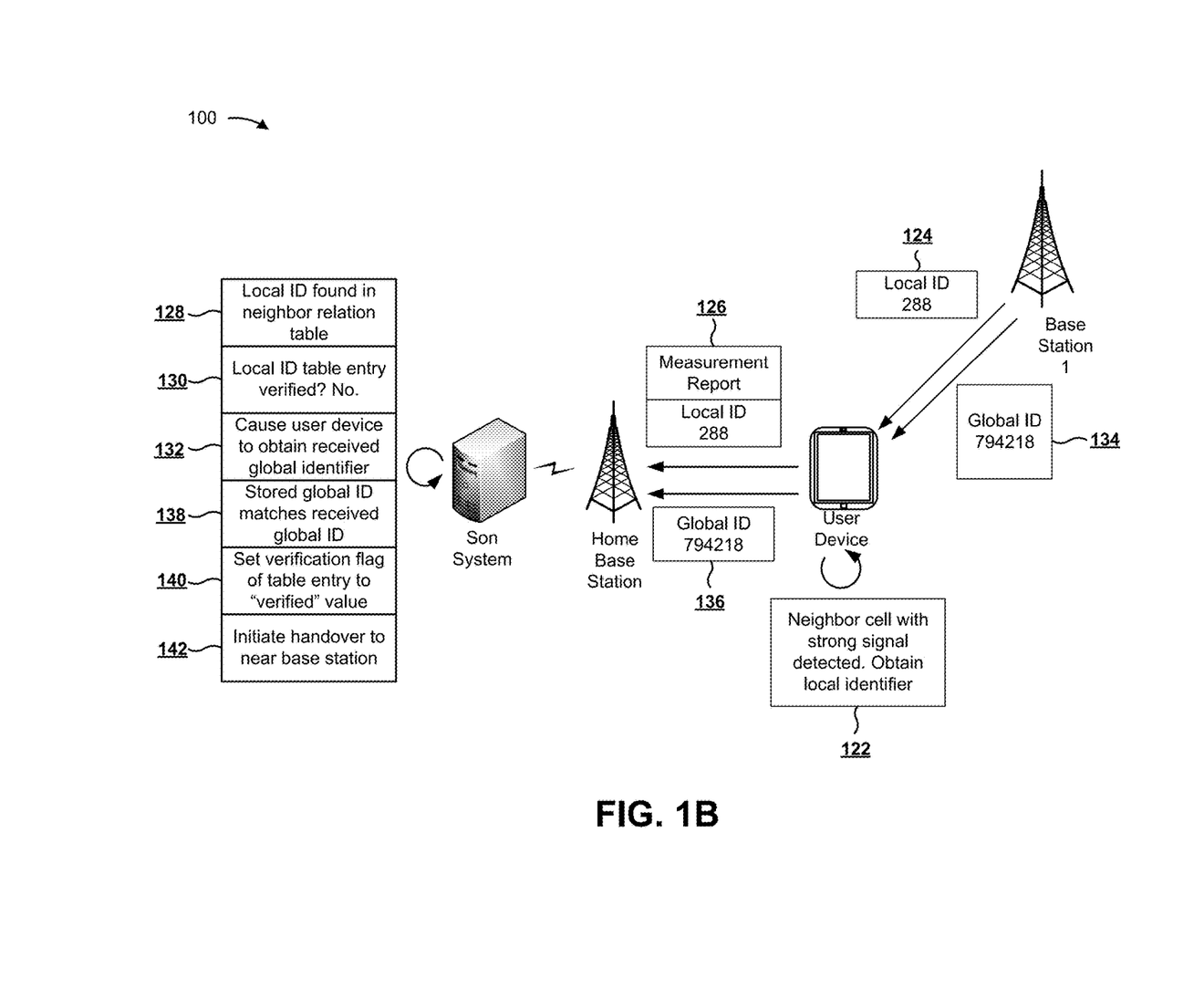
Figure 1C:
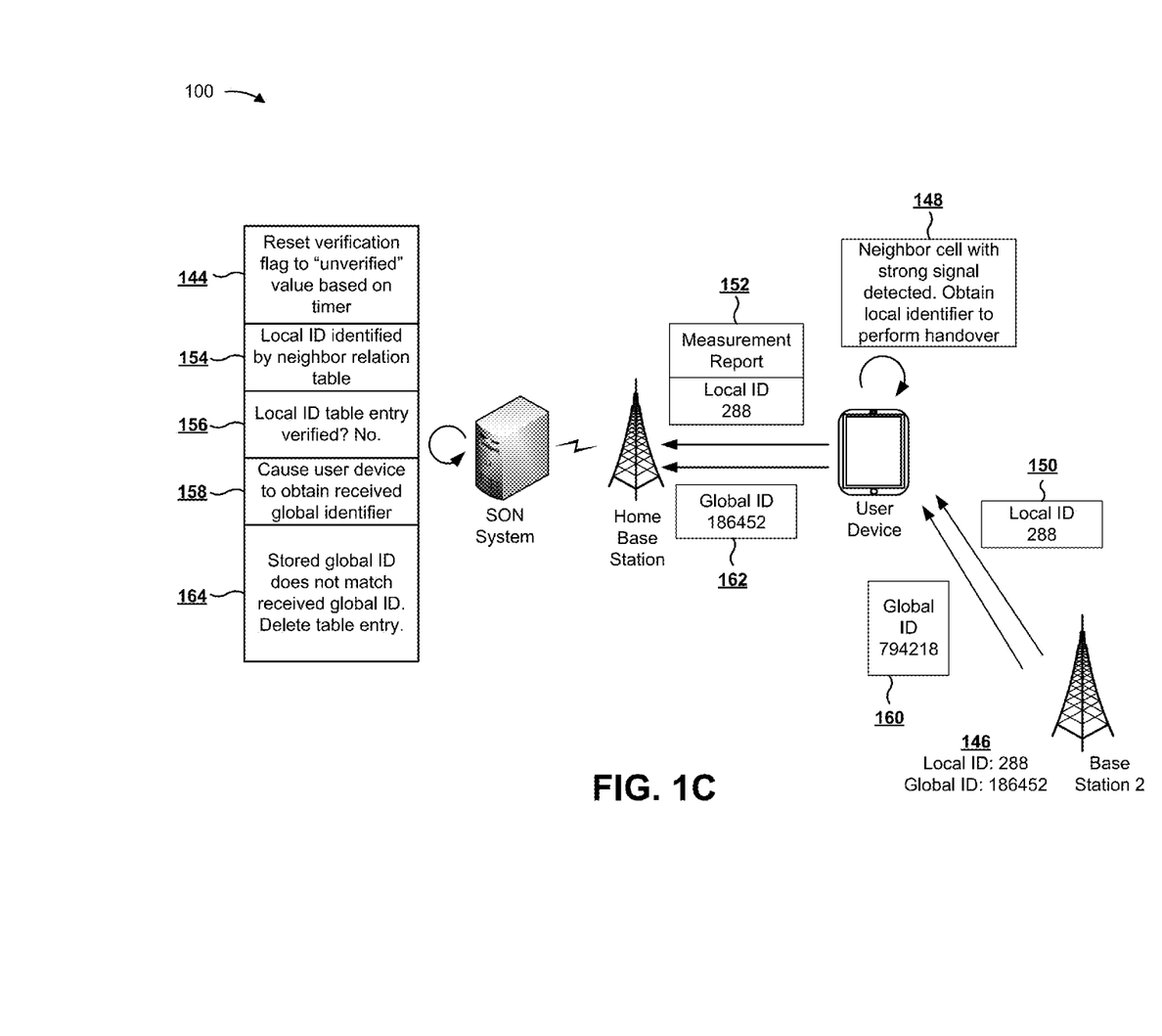

FIGS. 1A-1C are diagrams of an overview of an example implementation 100 described herein. As shown in FIG. 1, and by reference number 102, example implementation 100 includes a serving base station. The serving base station may include a base station on which the user device is camped, a base station that provides a serving cell of the user device, or the like. As shown by reference number 104, example implementation 100 includes a first base station 1 (e.g., a base station that is located nearer to the user device than a second base station 2). The first base station (e.g., a cell provided by the first base station) is associated with a local identifier of 288 and a global identifier of 794218. As shown by reference number 106, example implementation 100 includes a second base station 2. The second base station (e.g., a cell provided by the second base station) is associated with a local identifier of 288, and a global identifier of 186452. Example implementation 100 also includes a SON system associated with the serving base station.

Because the first base station and the second base station have the same local identifiers but different global identifiers, if the user device were to connect to the second base station before the user device connects to the first base station, issues may arise over time. For example, an entry may be added to the neighbor relation table of the SON system that identifies the global identifier associated with the second base station. When a user device subsequently identifies the local identifier of 288, the SON system may initiate a handover to the second base station based on the neighbor relation table, irrespective of whether the user device has, in fact, detected the cell associated with the first base station or the cell associated with the second base station. This may cause failed handovers, diminution of network performance, and other issues.

As shown by reference number 108, the user device detects a neighbor cell that has a strong signal (e.g., based on a signal power measurement, such as a received signal reference power (RSRP), that satisfies a threshold or that is better than a measurement associated with a cell of the serving base station). Here, the neighbor cell is provided by the first base station. As shown by reference number 110, the user device obtains the local identifier of 288 from the first base station to facilitate handover to the first base station based on detecting that the neighbor cell associated with the first base station has a strong signal.

As shown by reference number 112, the user device provides a measurement report to the serving base station. The measurement report may include the measurement information (e.g., the signal measurement) for the neighbor cell. The user device also provides the local identifier of 288, associated with the first base station, to the serving base station. For example, the measurement report, or a message that includes the measurement report, may identify the local identifier of 288. The serving base station provides the measurement report and the local identifier of 288 to the SON system.

As shown by reference number 114, the SON system determines that the local identifier of 288 for the first base station is not stored in the neighbor relation table. The SON system then causes the user device to obtain the global identifier from the first base station. For example, and as shown by reference number 116, the first base station provides the global identifier of 794218 to the user device. As shown by reference number 118, the user device provides the global identifier of 794218 to the serving base station, which provides the global identifier of 794218 to the SON system.

As shown by reference number 120, the SON system adds the global identifier of 794218 and the local identifier of 288 to the neighbor relation table (e.g., stores the global identifier of 794218, as a stored global identifier, and stores the local identifier of 288, in the neighbor relation table). The SON system then initiates a handover to the first base station based on the global identifier.

For the purpose of FIG. 1B, assume that the user device is no longer connected with the cell associated with first base station. For example, the user device may be a different user device than the user device described in FIG. 1A, or may have subsequently disconnected from the cell associated with the first base station.

As shown in FIG. 1B, and by reference number 122, the user device detects the neighbor cell, associated with the first base station, and determines that the neighbor cell is associated with a strong signal (e.g., based on the signal power measurement described above). As shown by reference number 124, the user device obtains the local identifier of 288 from the first base station based on detecting the signal associated with the first base station.

As shown by reference number 126, the user device provides a measurement report to the serving base station. The measurement report may include measurement information for the first base station. As further shown, the user device also provides the local identifier of 288 to the serving base station. The serving base station provides the measurement report and the local identifier of 288 to the SON system.

As shown by reference number 128, the SON system identifies the local identifier of 288 associated with the first base station in the neighbor relation table. For example, the SON system may identify a neighbor relation that identifies the local identifier and the stored global identifier of 794218. As shown by reference number 130, the SON system determines that the local identifier of 288 for the first base station has not been verified as associated with the stored global identifier (e.g., based on a verification flag associated with the neighbor relation). As shown by reference number 132, the SON system causes the user device to obtain a received global identifier for the first base station.

As shown by reference number 134, the first base station provides a received global identifier of 794218 to the user device. As shown by reference number 136, the user device provides the received global identifier of 794218 to the serving base station. The serving base station provides the received global identifier of 794218 to the SON system.

As shown by reference number 138, the SON system determines that the stored global identifier matches the received global identifier obtained by the user device. As shown by reference number 140, based on the received global identifier matching the stored global identifier, the SON system sets a verification flag of the neighbor relation table entry for the first base station to a "verified" value. As shown by reference number 142, the SON system initiates a handover to the first base station based on the received global identifier matching the stored global identifier.

If the SON system were to subsequently receive a measurement report that identifies the local identifier of 288, the SON system may automatically identify the stored global identifier of 794218 based on the neighbor relation table, may determine that the neighbor relation associated with the local identifier is associated with a verified state, and may automatically cause handover to the cell associated with the stored global identifier based on the neighbor relation table. Thus, the neighbor relation table improves efficiency of a handover and conserves resources. Further, by causing the user device to perform the verification process, the SON system improves reliability of the neighbor relation table and reduces erroneous information in the neighbor relation table.

As shown in FIG. 1C, and by reference number 144, the SON system may reset the verification flag associated with the neighbor relation of the neighbor relation table to an "unverified" value based on a timer (e.g., a daily timer, a weekly timer, a monthly timer, a timer of X minutes or hours or days, etc.).

As shown by reference number 146, the second base station is associated with a local identifier of 288 and a global identifier of 186452. Assume that the cell associated with the first base station is impeded. For example, the cell associated with the first base station may be impeded by an obstacle, a weather condition, an environment of the user device (e.g., indoors or outdoors), or the like. As shown by reference number 148, the user device detects a neighbor cell (e.g., a cell provided by the second base station) that is associated with a strong signal (e.g., a signal power measurement that satisfies a threshold or that is better than a signal power measurement associated with a serving cell of the user device, as described above), and determines to obtain a local identifier associated with the neighbor cell to cause a handover to the neighbor cell.

As shown by reference number 150, the second base station provides the local identifier of 288 to the user device (e.g., based on receiving a request for the local identifier from the user device). As shown by reference number 152, the user device provides a measurement report that identifies the local identifier of 288 to the serving base station. As shown by reference number 154, the SON system identifies the local identifier of 288 in the neighbor relation table. As shown by reference number 156, the SON system determines that the local identifier entry in the neighbor relation table is not verified (i.e., based on the SON system having set the verification flag to an "unverified" value based on the timer).

As shown by reference number 158, the SON system causes the user device to obtain a received global identifier from the second base station. As shown by reference number 160, the second base station provides the received global identifier of 186452 to the user device. As shown by reference number 162, the user device provides the received global identifier of 186452 to the serving base station. The serving base station provides the received global identifier of 186452 to the SON system. As shown by reference number 164, the SON system determines that the stored global identifier of 794218 does not match the received global identifier of 186452. Based on determining that the stored global identifier does not match the received global identifier, the SON system deletes the entry in the neighbor relation table for the second base station. When the SON system later receives the local identifier from a user device, the SON system may perform the operations described in connection with FIG. 1A to add a neighbor relation identifying the local identifier and a corresponding global identifier to the neighbor relation table.

In this way, incidents of inaccurate neighbor relations are reduced, which improves network performance and reduces erroneous handovers. Additionally, areas associated with coverage by two cells with the same local identifier are automatically identified, which reduces reliance on humans to identify these areas. Furthermore, because the SON system verifies the verification flag during the handover/measurement process of the user device, real-time identification of neighbor relation issues based on in-the-field conditions is enabled, which is difficult or impossible for a human to perform.

As described in example implementation 100, the SON system is a distributed SON (i.e. there is an instance of the process running on each cell). In some implementations, a centralized SON process may be used, wherein a single instance of the SON system may be hosted at a centralized location. In such a case, the distributed automated neighbor relation process described herein could create a notification to the centralized SON, when a received global identifier does not match a stored global identifier associated with a particular local identifier, and the centralized SON may take an action to change a local identifier of one of the two reported cells.

As indicated above, FIGS. 1A-1C are provided merely as an example. Other examples are possible and may differ from what was described with regard to FIGS. 1A-1C.

Figure 2:
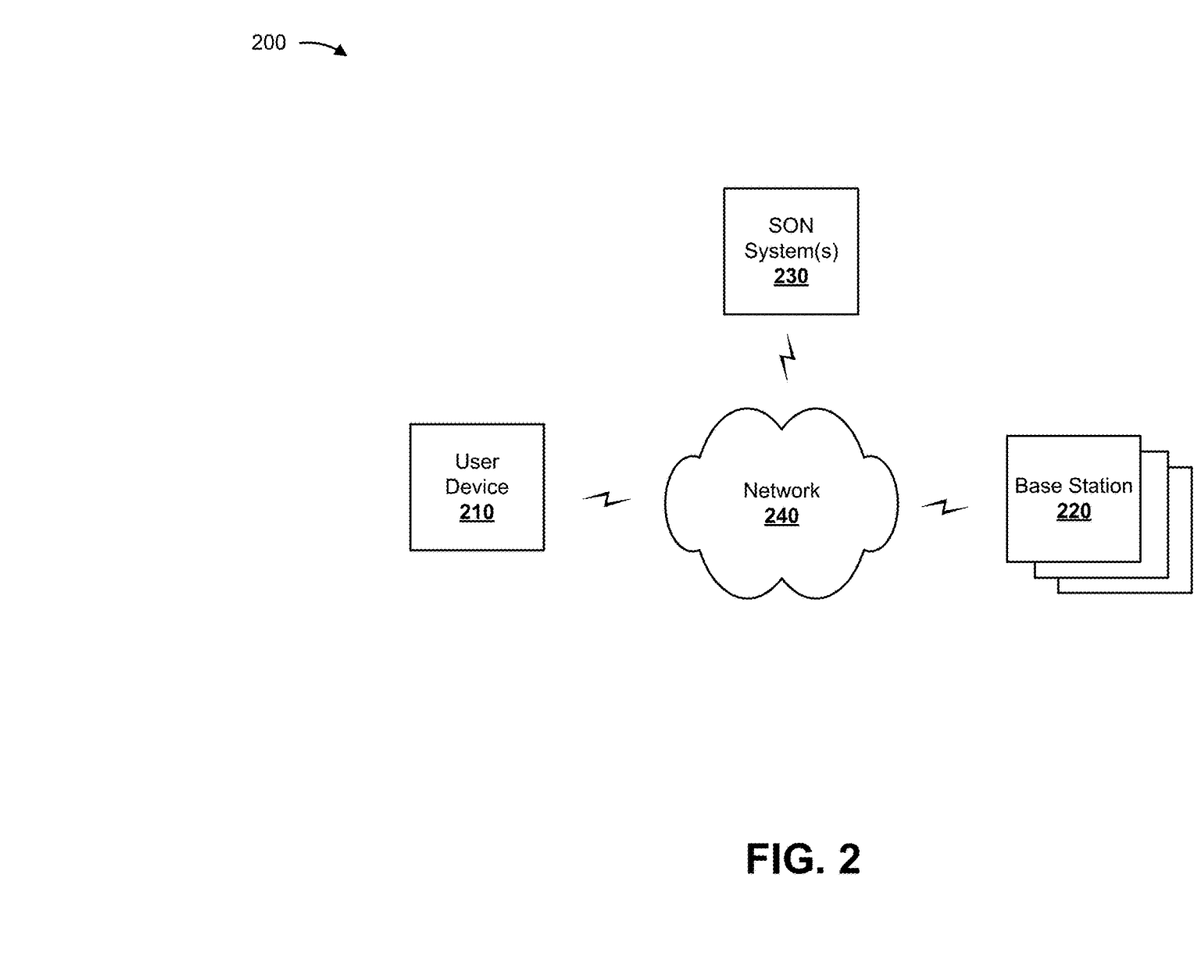
FIG. 2 is a diagram of an example environment in which systems and/or methods, described herein, may be implemented.

FIG. 2 is a diagram of an example environment 200 in which systems and/or methods, described herein, may be implemented. As shown in FIG. 2, environment 200 may include a user device 210, a base station 220, a SON system 230, and a network 240. Devices of environment 200 may interconnect via wired connections, wireless connections, or a combination of wired and wireless connections.

User device 210 includes one or more devices capable of receiving, generating, storing, processing, and/or providing information, such as information relating to a handover process between base stations 220. For example, user device 210 may include a communication and/or computing device, such as a mobile phone (e.g., a smart phone, a radiotelephone, etc.), a laptop computer, a tablet computer, a handheld computer, a gaming device, a wearable communication device (e.g., a smart wristwatch, a pair of smart eyeglasses, etc.), or a similar type of device.

Base station 220 includes one or more devices capable of communicating with user device 210 using a cellular radio access technology. For example, base station 220 may include a base transceiver station, a radio base station, a node B, an evolved node B (eNB), a base station subsystem, a cellular site, a cellular tower (e.g., a cell phone tower, a mobile phone tower, etc.), a radio access node, a macrocell base station, a microcell base station, a picocell base station, a femtocell base station, or a similar type of device. Base station 220 may transfer traffic between user device 210 and network 240. In some implementations, base station 220 may communicate with user device 210 (and/or one or more other devices) using radio waves.

SON system 230 may include one or more devices capable of receiving, generating, storing, processing, and/or providing information, such as information related to managing handover between base stations 220. For example, SON system 230 may include one or more computing devices, such as one or more server devices, desktop computers, workstation computers, virtual machines (VMs) provided in a cloud computing environment, or similar devices. In some implementations, SON system 230 may be utilized by an entity that manages and/or operates one or more portions of environment 200, such as, for example, a telecommunication service provider, a television service provider, an Internet service provider, or the like. In some implementations, SON system 230 may be utilized by an entity that manages and/or operates network 240. In some implementations, SON system 230 may be centralized with regard to a particular base station 220 or other network element. Additionally, or alternatively, SON system 230 may be distributed (e.g., may be distributed over two or more base stations 220, may be provided in a cloud environment, etc.).

Network 240 includes one or more wired and/or wireless networks. For example, network 240 may include a cellular network (e.g., a long-term evolution (LTE) network, a code division multiple access (CDMA) network, a 3G network, a 4G network, a 5G network, another type of advanced generated network, etc.), a public land mobile network (PLMN), a local area network (LAN), a wide area network (WAN), a metropolitan area network (MAN), a telephone network (e.g., the Public Switched Telephone Network (PSTN)), a private network, an ad hoc network, an intranet, the Internet, a fiber optic-based network, a cloud computing network, or the like, and/or a combination of these or other types of networks.

The number and arrangement of devices and networks shown in FIG. 2 are provided as an example. In practice, there may be additional devices and/or networks, fewer devices and/or networks, different devices and/or networks, or differently arranged devices and/or networks than those shown in FIG. 2. Furthermore, two or more devices shown in FIG. 2 may be implemented within a single device, or a single device shown in FIG. 2 may be implemented as multiple, distributed devices. Additionally, or alternatively, a set of devices (e.g., one or more devices) of environment 200 may perform one or more functions described as being performed by another set of devices of environment 200.

Figure 3:
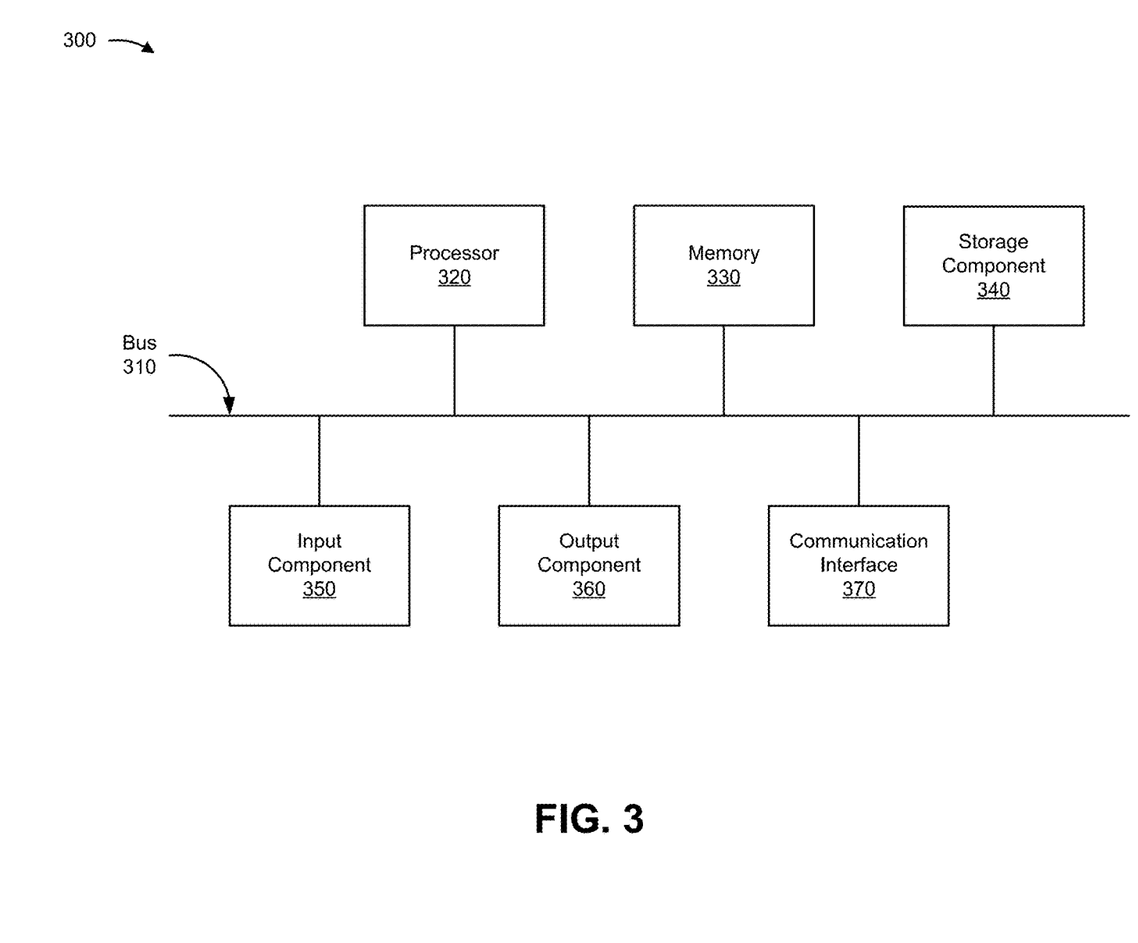
FIG. 3 is a diagram of example components of one or more devices of FIG. 2.

FIG. 3 is a diagram of example components of a device 300. Device 300 may correspond to user device 210, base station 220, and/or SON system 230. In some implementations, user device 210, base station 220, and/or SON system 230 may include one or more devices 300 and/or one or more components of device 300. As shown in FIG. 3, device 300 may include a bus 310, a processor 320, a memory 330, a storage component 340, an input component 350, an output component 360, and a communication interface 370.

Bus 310 includes a component that permits communication among the components of device 300. Processor 320 is implemented in hardware, firmware, or a combination of hardware and software. Processor 320 includes a processor (e.g., a central processing unit (CPU), a graphics processing unit (GPU), and/or an accelerated processing unit (APU)), a microprocessor, a microcontroller, and/or any processing component (e.g., a field-programmable gate array (FPGA) and/or an application-specific integrated circuit (ASIC)) that interprets and/or executes instructions. In some implementations, processor 320 includes one or more processors capable of being programmed to perform a function. Memory 330 includes a random access memory (RAM), a read only memory (ROM), and/or another type of dynamic or static storage device (e.g., a flash memory, a magnetic memory, and/or an optical memory) that stores information and/or instructions for use by processor 320.

Storage component 340 stores information and/or software related to the operation and use of device 300. For example, storage component 340 may include a hard disk (e.g., a magnetic disk, an optical disk, a magneto-optic disk, and/or a solid state disk), a compact disc (CD), a digital versatile disc (DVD), a floppy disk, a cartridge, a magnetic tape, and/or another type of non-transitory computer-readable medium, along with a corresponding drive.

Input component 350 includes a component that permits device 300 to receive information, such as via user input (e.g., a touch screen display, a keyboard, a keypad, a mouse, a button, a switch, and/or a microphone). Additionally, or alternatively, input component 350 may include a sensor for sensing information (e.g., a global positioning system (GPS) component, an accelerometer, a gyroscope, and/or an actuator). Output component 360 includes a component that provides output information from device 300 (e.g., a display, a speaker, and/or one or more light-emitting diodes (LEDs)).

Communication interface 370 includes a transceiver-like component (e.g., a transceiver and/or a separate receiver and transmitter) that enables device 300 to communicate with other devices, such as via a wired connection, a wireless connection, or a combination of wired and wireless connections. Communication interface 370 may permit device 300 to receive information from another device and/or provide information to another device. For example, communication interface 370 may include an Ethernet interface, an optical interface, a coaxial interface, an infrared interface, a radio frequency (RF) interface, a universal serial bus (USB) interface, a Wi-Fi interface, a cellular network interface, or the like.

Device 300 may perform one or more processes described herein. Device 300 may perform these processes in response to processor 320 executing software instructions stored by a non-transitory computer-readable medium, such as memory 330 and/or storage component 340. A computer-readable medium is defined herein as a non-transitory memory device. A memory device includes memory space within a single physical storage device or memory space spread across multiple physical storage devices.

Software instructions may be read into memory 330 and/or storage component 340 from another computer-readable medium or from another device via communication interface 370. When executed, software instructions stored in memory 330 and/or storage component 340 may cause processor 320 to perform one or more processes described herein. Additionally, or alternatively, hardwired circuitry may be used in place of or in combination with software instructions to perform one or more processes described herein. Thus, implementations described herein are not limited to any specific combination of hardware circuitry and software.

The number and arrangement of components shown in FIG. 3 are provided as an example. In practice, device 300 may include additional components, fewer components, different components, or differently arranged components than those shown in FIG. 3. Additionally, or alternatively, a set of components (e.g., one or more components) of device 300 may perform one or more functions described as being performed by another set of components of device 300.

Figure 4:
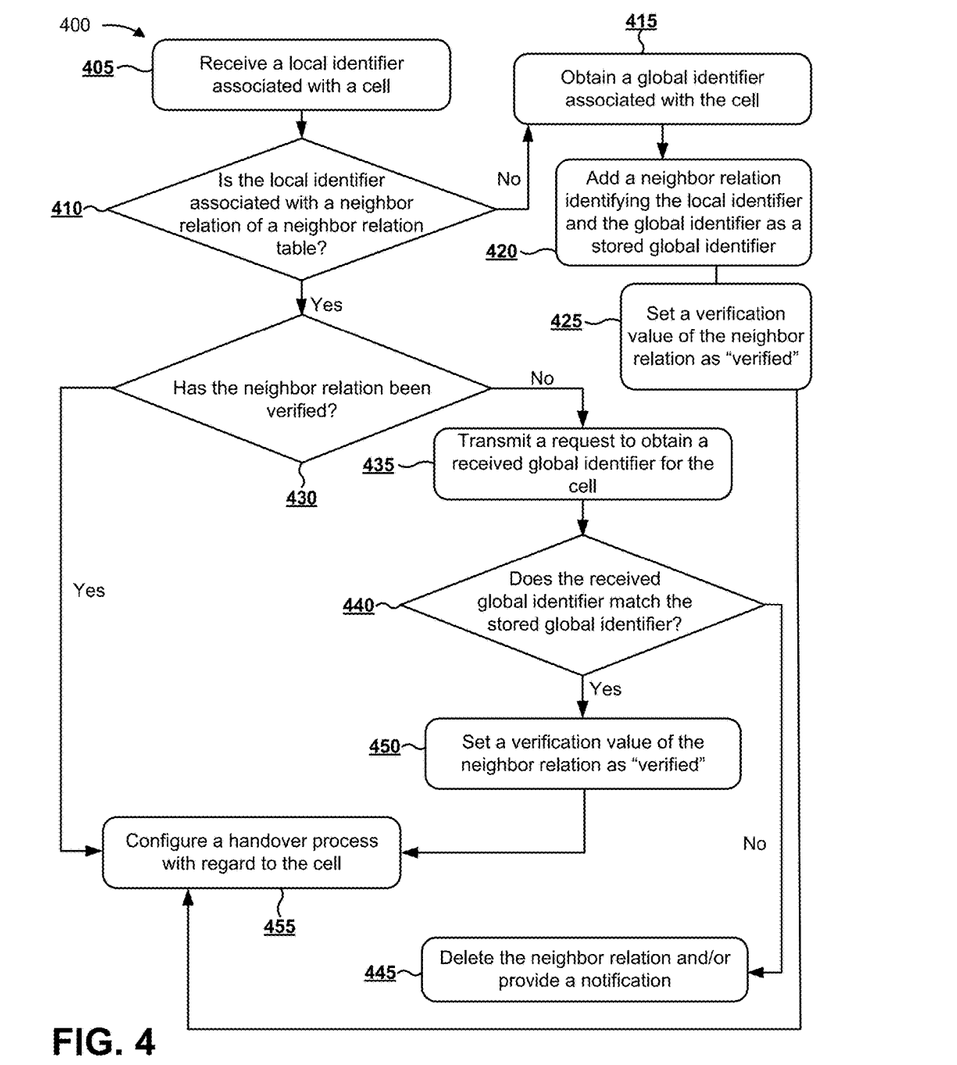
FIG. 4 is a flow chart of an example process for deleting and/or updating erroneous neighbor relation table entries.

FIG. 4 is a flow chart of an example process 400 for deleting and/or updating erroneous neighbor relation table entries. In some implementations, one or more process blocks of FIG. 4 may be performed by SON system 230. In some implementations, one or more process blocks of FIG.

4 may be performed by another device or a group of devices separate from or including SON system 230, such as user device 210 and base station 220.

As shown in FIG. 4, process 400 may include receiving a local identifier associated with a cell (block 405). For example, SON system 230 may receive measurement information that identifies a local identifier for a cell. In some implementations, SON system 230 may receive measurement information from user device 210. The measurement information may identify a signal strength or signal quality associated with a cell. For example, when user device 210 is connected to a first cell, and receives a signal from a second cell that is stronger than the signal from the first cell, user device 210 may obtain measurement information for the second cell (e.g., to cause serving base station 220 or SON system 230 to initiate a handover to the second cell). The measurement information may identify a local identifier for the second cell (e.g., a network address, a PCI, a cell identifier (CID), an E-UTRAN Cell Identifier (ECI), or the like).

In some implementations, the measurement information may be included in a measurement report. The measurement report may indicate that a measurement associated with a serving cell signal satisfies or does not satisfy a threshold. Additionally, or alternatively, the measurement report may indicate that a measurement associated with the neighbor cell signal has become better than a measurement associated with a serving cell signal by an offset value. Additionally, or alternatively, the measurement report may indicate that a measurement associated with the neighbor cell signal satisfies a threshold. Additionally, or alternatively, the measurement report may indicate that the measurement associated with the serving cell signal does not satisfy a first threshold and a measurement associated with a neighbor cell signal satisfies a second threshold. Additionally, or alternatively, the measurement report may indicate that a measurement associated with a neighbor cell signal is better than a measurement associated with the serving cell signal by a particular offset. As examples, the measurement report may include an A1 report, an A2 report, an A3 report, an A4 report, an A5 report, an A6 report, or any other measurement report to be generated by user device 210.

In some implementations, the measurement report may identify a signal power or quality measurement (e.g., a reference signal receive power (RSRP), a reference signal receive quality (RSRQ), a received signal level (RxLEV), an energy per chip over the noise spectral density (Ec/n0), a channel quality indicator (CQI), etc.) associated with the cell corresponding to the local identifier. SON system 230 may initiate handover based on a value of the signal power or quality measurement (e.g., based on comparing a signal power or quality measurement, of the cell corresponding to the local identifier, to a signal power or quality measurement associated with a serving cell of user device 210).

As further shown in FIG. 4, process 400 may include determining whether the local identifier is associated with a neighbor relation of a neighbor relation table (block 410). For example, SON system 230 may determine whether a neighbor relation identifying a stored global identifier is associated with the local identifier. In some implementations, each cell associated with base station 220 may have a local identifier (e.g., a PCI or a similar value) and a particular global identifier (e.g., an eCGI or a similar value). When SON system 230 has received measurement information (e.g., a measurement report) including a local identifier associated with a neighbor cell that has better signal strength or quality than a serving cell of user device 210, SON system 230 may store the information identifying the local identifier and the global identifier in a neighbor relation table. For example, SON system 230 may cause user device 210 to obtain the global identifier, and may add the global identifier to the neighbor relation table in association with the local identifier. This permits a quick handover of user devices 210 from the serving cell to the neighbor cell in the future (e.g., without having to obtain the global identifier, via user device 210, from base station 220 that is associated with the neighbor cell). SON system 230 may identify a stored global identifier, in the neighbor relation table, associated with the local identifier.

In some implementations, SON system 230 may determine that the neighbor relation table does not include a stored global identifier associated with the local identifier. For example, the local identifier may not have been received by SON system 230 before. As another example, a neighbor relation table entry associated with the local identifier may have previously been deleted or removed based on a conflict between two global identifiers associated with the local identifier.

As further shown in FIG. 4, when the local identifier is not associated with a neighbor relation (block 410—NO), then process 400 may include obtaining a global identifier associated with the cell (block 415). For example, SON system 230 may cause user device 210 to obtain a global identifier associated with the cell. In some implementations, SON system 230 may transmit a request to user device 210 for a global identifier associated with the cell and/or the local identifier. User device 210 may obtain the global identifier associated with the cell, and may provide the global identifier to SON system 230.

As further shown in FIG. 4, process 400 may include adding a neighbor relation identifying the local identifier and the global identifier as a stored global identifier (block 420). For example, user device 210 may obtain the global identifier, and may provide the global identifier for addition to the neighbor relation table. SON system 230 may generate a neighbor relation in the neighbor relation table that identifies the local identifier and the global identifier (e.g., as a stored global identifier).

As further shown in FIG. 4, process 400 may include setting a verification value of the neighbor relation as "verified" (block 425). For example, the neighbor relation table may include verification information or a verification value (e.g., a flag, a bit, or the like) that may be set to a particular value to indicate whether the neighbor relation table entry has been verified. For example, the verification value may be set to a value associated with an unverified state when the table entry has not been verified within a particular length of time, when a local identifier of two or more nearby cells are associated with conflicting global identifiers, or the like, as described in more detail elsewhere herein. The verification value may be set to a value associated with a verified state when SON system 230 generates the neighbor relation, and when SON system 230 has verified that the stored global identifier matches a received global identifier provided by user device 210, as also described in more detail elsewhere herein.

As further shown in FIG. 4, when the local identifier is associated with a neighbor relation (block 410—YES), then process 400 may include determining whether the neighbor relation has been verified (block 430). For example, SON system 230 may determine whether the neighbor relation associated with the local identifier has been verified. Verification may include a process of determining whether a stored global identifier, associated with a neighbor relation, matches a received global identifier, as described in more detail below. SON system 230 may determine that the stored global identifier has been verified when the stored global identifier has been compared to a received global identifier obtained from user device 210, and when the stored global identifier matches the received global identifier.

SON system 230 may determine that the stored global identifier has not been verified when SON system 230 has not determined whether the stored global identifier matches an received global identifier obtained from user device 210, or when SON system 230 has not determined whether the stored global identifier matches an received global identifier within a particular time period. Additionally, or alternatively, SON system 230 may determine that the stored global identifier has not been verified when a particular condition has caused a verification state associated with the stored global identifier to be reset or set to an unverified state.

As further shown in FIG. 4, when the neighbor relation has not been verified (block 430—NO), then process 400 may include transmitting a request to obtain a received global identifier for the cell (block 435). For example, when the neighbor relation associated with the local identifier and the stored global identifier has not been verified (e.g., has never been verified, has not been verified in a particular period of time, etc.), SON system 230 may cause user device 210 to obtain a received global identifier for the cell.

In some implementations, SON system 230 may cause user device 210 to request the received global identifier from base station 220 associated with the cell. In this way, SON system 230 causes user device 210 in a coverage area of the cell to verify the global identifier associated with the local identifier, which permits identification of erroneous neighbor relation table entries when a stored global identifier is not associated with the cell that has the best signal strength or quality at a particular location.

As further shown in FIG. 4, process 400 may include determining whether the received global identifier matches the stored global identifier (block 440). For example, SON system 230 may receive the received global identifier from user device 210, and SON system 230 may compare the received global identifier and the stored global identifier to determine whether the received global identifier matches the stored global identifier.

As further shown in FIG. 4, when the received global identifier does not match the stored global identifier (block 440—NO), then process 400 may include deleting the neighbor relation and/or providing a notification (block 445). For example, when the global identifier received by user device 210 does not match the stored global identifier, then SON system 230 may delete the neighbor relation and/or provide a notification based on determining that the global identifier measured by user device 210 does not match the stored global identifier.

In some implementations, SON system 230 may cause a notification to be provided to a technician, may cause the neighbor relation corresponding to the local identifier to be removed or deleted, or the like. Additionally, or alternatively, SON system 230 may cause one or more base stations 220 to be reconfigured. For example, SON system 230 may cause a signal strength of a cell associated with the received global identifier or the stored global identifier to be strengthened or weakened. Additionally, or alternatively, SON system 230 may adjust beamforming of one or more cells and/or base stations 220. Additionally, or alternatively, SON system 230 may cause a local identifier of one or more cells to be changed.

As further shown in FIG. 4, when the received global identifier matches the stored global identifier (block 440—YES), then process 400 may include setting a verification value of the neighbor relation as "verified" (block 450). For example, when the received global identifier obtained by user device 210 matches the stored global identifier, then SON system 230 may store information indicating that the neighbor relation table entry corresponding to the local identifier has been verified. As an example, SON system 230 may set a value of a verification flag to a value associated with a verified state. In some implementations, SON system 230 may set the value of the verification flag for a particular length of time (e.g., 1 day, 1 week, or the like). In this way, even if the received global identifier happens to match the stored global identifier in a situation where the measured/local global identifier is associated with a weaker or less preferable cell, SON system 230 will cause the global identifier to be verified again after the particular length of time.

As further shown in FIG. 4, when the neighbor relation has been generated as described in connection with blocks 415-425, or when the neighbor relation has previously been verified (block 430—YES), or when the received global identifier matches the stored global identifier (block 440—YES), then process 400 may include configuring a handover process with regard to the cell (block 455). For example, SON system 230 may cause user device 210 to be handed over from another cell, associated with a lower signal quality or strength, to the cell associated with the local identifier. In this way, SON system 230 facilitates management of the neighbor relation table based on a verification process, which reduces a likelihood of misconfiguration of the neighbor relation table. Thus, SON system 230 improves consistency of the handover process and improves network performance.

In some implementations, SON system 230 may receive subsequent measurement information that identifies the local identifier. For example, user device 210 may subsequently enter a coverage area of the cell. User device 210 may then generate or obtain measurement information for the cell that includes the local identifier, and may provide the measurement information to SON system 230. SON system 230 may again determine whether a table entry corresponding to the global identifier has been verified. If the global identifier has been verified, then SON system 230 may automatically trigger handover to a cell associated with the global identifier. If the global identifier has not been verified, then SON system 230 may cause the verification process to be performed (as described with reference to blocks 440-480). In this way, SON system 230 facilitates verification of neighbor relation table entries to reduce a likelihood of misconfiguration of neighbor relation table.

Implementations described herein may reduce the likelihood of an erroneous neighbor relation being maintained in a neighbor relation table. As an example, consider a source cell associated with a neighbor relation table, a near neighbor cell, and a far neighbor cell. Assume a probability $P_0=0.001$ of the global identifier associated with the far cell being added to the neighbor relation table. During the verification process, the global identifier associated with the far neighbor cell will be replaced with the global identifier associated with the near neighbor cell if the near neighbor cell is detected first, and if the global identifier associated with the near neighbor cell is reported when the new neighbor relation is created (e.g., after the erroneous neighbor relation associated with the far neighbor cell is deleted). The probability of this occurrence may be approximately $P_C=(1-P_0)\times(1-P_0)$, or 0.998. As another example, the probability of erroneously restoring the global identifier associated with the far neighbor cell may be equal to $P_E=P_0\times P_0$, or 0.000001.

When using the verification process, there may be three scenarios in which the global identifier associated with the far neighbor cell is added after verification of the neighbor relation. The first scenario is when the global identifier associated with the far neighbor cell was initially added to the neighbor relation, and the global identifier associated with the far neighbor cell is again reported during the verification process. The second scenario is when the global identifier associated with the far neighbor cell was initially added to the neighbor relation, then the neighbor relation is deleted based on receiving the global identifier associated with the near neighbor cell during the verification process, then the global identifier associated with the far neighbor cell is used to recreate the neighbor relation. The third scenario is when the global identifier associated with the near neighbor cell was initially added to the neighbor relation, and the global identifier associated with the far neighbor cell replaces the global identifier associated with the near neighbor cell in the verification process.

The sum of probabilities of these three events may be $P_1=P_0\times P_0+P_1\times(1-P_0)\times P_0+(1-P_0)\times P_0\times P_0=3P_0^2-2P_0^3$, or roughly $3\times P_0^2$ for small $P_0$ values. Here, this value is approximately $3\times 10^{-6}$. Similarly, the probability of the global identifier associated with the far neighbor cell remaining in the neighbor relation after a second iteration of the verification process is $P_2=P_1\times P_0+P_1\times(1-P_0)\times P_0+(1-P_1)\times P_0\times P_0$, or approximately $P_0^2$ for small values of $P_0$. More generally, for a given iteration of the verification process N, $P_N$ is roughly $P_0^2$, for small values of $P_0$.

Although FIG. 4 shows example blocks of process 400, in some implementations, process 400 may include additional blocks, fewer blocks, different blocks, or differently arranged blocks than those depicted in FIG. 4. Additionally, or alternatively, two or more of the blocks of process 400 may be performed in parallel.

In implementations described herein, inaccurate neighbor relations are automatically identified and an action is performed to reduce or eliminate the inaccurate neighbor relations. Further, real-time identification of cells associated with overlapping local identifiers based on field conditions is enabled. Thus, network performance is improved and erroneous handovers are reduced. Further, automatically identifying inaccurate neighbor relations reduces reliance on humans to identify neighbor relations, and improves efficiency of identifying the inaccurate neighbor relations.

The foregoing disclosure provides illustration and description, but is not intended to be exhaustive or to limit the implementations to the precise form disclosed. Modifications and variations are possible in light of the above disclosure or may be acquired from practice of the implementations.

As used herein, the term component is intended to be broadly construed as hardware, firmware, or a combination of hardware and software.

Some implementations are described herein in connection with thresholds. As used herein, satisfying a threshold may refer to a value being greater than the threshold, more than the threshold, higher than the threshold, greater than or equal to the threshold, less than the threshold, fewer than the threshold, lower than the threshold, less than or equal to the threshold, equal to the threshold, etc.

To the extent the aforementioned embodiments collect, store, or employ personal information provided by individuals, it should be understood that such information shall be used in accordance with all applicable laws concerning protection of personal information. Additionally, the collection, storage, and use of such information may be subject to consent of the individual to such activity, for example, through well known "opt-in" or "opt-out" processes as may be appropriate for the situation and type of information. Storage and use of personal information may be in an appropriately secure manner reflective of the type of information, for example, through various encryption and anonymization techniques for particularly sensitive information.

It will be apparent that systems and/or methods, described herein, may be implemented in different forms of hardware, firmware, or a combination of hardware and software. The actual specialized control hardware or software code used to implement these systems and/or methods is not limiting of the implementations. Thus, the operation and behavior of the systems and/or methods were described herein without reference to specific software code—it being understood that software and hardware can be designed to implement the systems and/or methods based on the description herein.

Even though particular combinations of features are recited in the claims and/or disclosed in the specification, these combinations are not intended to limit the disclosure of possible implementations. In fact, many of these features may be combined in ways not specifically recited in the claims and/or disclosed in the specification. Although each dependent claim listed below may directly depend on only one claim, the disclosure of possible implementations includes each dependent claim in combination with every other claim in the claim set.

No element, act, or instruction used herein should be construed as critical or essential unless explicitly described as such. Also, as used herein, the articles "a" and "an" are intended to include one or more items, and may be used interchangeably with "one or more." Furthermore, as used herein, the term "set" is intended to include one or more items (e.g., related items, unrelated items, a combination of related and unrelated items, etc.), and may be used interchangeably with "one or more." Where only one item is intended, the term "one" or similar language is used. Also, as used herein, the terms "has," "have," "having," or the like are intended to be open-ended terms. Further, the phrase "based on" is intended to mean "based, at least in part, on" unless explicitly stated otherwise.

What is claimed is:

1. A cellular network device, comprising:
   one or more processors to:
      receive, from a user device, a local identifier associated with a cell of a cellular network;
      identify a stored global identifier corresponding to the local identifier based on a neighbor relation associated with the local identifier;
      determine that the stored global identifier is not verified as associated with the local identifier;
      cause a received global identifier to be obtained by the user device based on determining that the stored global identifier is not verified as associated with the local identifier;
      determine whether the stored global identifier matches the received global identifier; and
      selectively cause a handover of the user device to the cell to the cell based on determining whether the stored global identifier matches the received global identifier, the cellular network device causing handover of the user device when the stored global identifier matches the received global identifier, and
the cellular network device not causing handover of the user device to be performed when the stored global identifier does not match the received global identifier, and
the cellular network device deleting the neighbor relation when the stored global identifier does not match the received global identifier.

2. The cellular network device of claim 1, where the one or more processors, when determining that the stored global identifier is not verified as associated with the local identifier, are to:
determine that the stored global identifier has not been verified based on verification information associated with the stored global identifier or the local identifier.

3. The cellular network device of claim 1, where the one or more processors, when receiving the local identifier, are to:
receive the local identifier as part of a first message; and
where the one or more processors are further to:
receive a second message before the first message, the second message including the local identifier;
determine that the local identifier is not identified by a neighbor relation table associated with the cellular network device;
cause the user device to obtain a particular global identifier corresponding to the cell associated with the local identifier; and
store the particular global identifier as the stored global identifier.

4. The cellular network device of claim 1, where the one or more processors, when determining that the stored global identifier is not verified as associated with the local identifier, are to:
determine that the stored global identifier has not been verified as associated with the local identifier within a particular time period.

5. The cellular network device of claim 1, where the cell is a first cell corresponding to the received global identifier; and
where the stored global identifier is associated with a second cell,
the received global identifier being different than the stored global identifier; and
where the local identifier is associated with the first cell and the second cell.

6. The cellular network device of claim 5, where the user device is located in a coverage area of the first cell and the second cell.

7. The cellular network device of claim 1, where the one or more processors, when determining whether the stored global identifier matches the received global identifier, are to:
determine that the stored global identifier does not match the received global identifier; and
where the one or more processors, based on determining that the stored global identifier does not match the received global identifier, are to cause one or more of:
a notification to be provided to a technician,
a signal strength of the cell to be adjusted, or
the local identifier of the cell to be changed.

8. A non-transitory computer-readable medium storing instructions, the instructions comprising:
one or more instructions that, when executed by one or more processors of a cellular network device, cause the one or more processors to:
receive, from a user device, a local identifier associated with a cell of a cellular network;
identify a stored global identifier corresponding to the local identifier based on a data structure;
determine that the stored global identifier is not verified as associated with the local identifier based on a table entry of the data structure associated with the local identifier;
cause a received global identifier to be obtained by the user device based on determining that the stored global identifier is not verified as associated with the local identifier;
determine whether the stored global identifier matches the received global identifier; and
selectively cause a handover of the user device to the cell to the cell based on determining whether the stored global identifier matches the received global identifier,
the cellular network device causing the handover of the user device when the stored global identifier matches the received global identifier, and
the cellular network device not causing the handover of the user device to be performed when the stored global identifier does not match the received global identifier, and
the cellular network device deleting the table entry when the stored global identifier does not match the received global identifier.

9. The non-transitory computer-readable medium of claim 8, where the one or more instructions, that cause the one or more processors to determine that the stored global identifier is not verified as associated with the local identifier, cause the one or more processors to:
determine that the stored global identifier is not verified based on stored information indicating that the stored global identifier has not previously been verified as associated with the local identifier.

10. The non-transitory computer-readable medium of claim 8, where the one or more instructions, when executed by the one or more processors, further cause the one or more processors to:
store information indicating that the stored global identifier has been verified as associated with the local identifier when the stored global identifier matches the received global identifier.

11. The non-transitory computer-readable medium of claim 8, where the one or more instructions, that cause the one or more processors to receive the local identifier, cause the one or more processors to:
receive the local identifier as part of a first message; and
where the one or more instructions, when executed by the one or more processors, further cause the one or more processors to:
receive a second message before the first message, the second message including the local identifier;
determine that the local identifier is not identified by the data structure;
cause the user device to obtain a particular global identifier corresponding to the cell associated with the local identifier; and
store the particular global identifier as the stored global identifier.

12. The non-transitory computer-readable medium of claim 8, where the one or more instructions, that cause the one or more processors to receive the local identifier, cause the one or more processors to:
  receive a measurement report, generated by the user device, that identifies the local identifier.

13. The non-transitory computer-readable medium of claim 8, where the cell is a first cell corresponding to the received global identifier; and
  where the stored global identifier is associated with a second cell that is different from the first cell,
    the received global identifier being different than the stored global identifier; and
  where the local identifier is associated with the first cell and the second cell.

14. The non-transitory computer-readable medium of claim 13, where the user device is located in a coverage area of the first cell and the second cell.

15. The non-transitory computer-readable medium of claim 8, where the local identifier includes a physical cell identity (PCI); and
  where the stored global identifier and the received global identifier include one or more of:
    a cell global identity (CGI), or
    an evolved Universal Mobile Telecommunications System CGI (ECGI).

16. A method, comprising:
  receiving, by a cellular network device, a local identifier associated with a cell of a cellular network;
  identifying, by the cellular network device, a stored global identifier corresponding to the local identifier based on a neighbor relation table;
  determining, by the cellular network device and based on a neighbor relation of the neighbor relation table, that the stored global identifier is not verified as associated with the local identifier;
  causing, by the cellular network device, a received global identifier to be obtained based on determining that the stored global identifier is not verified as associated with the local identifier;
  determining, by the cellular network device, that the stored global identifier matches the received global identifier to verify the stored global identifier; and
  causing, by the cellular network device, a handover to the cell based on determining that the stored global identifier matches the received global identifier.

17. The method of claim 16, where determining that the stored global identifier is not verified as associated with the local identifier comprises:
  determining that the stored global identifier has not been verified as associated with the local identifier within a particular period of time before receiving the local identifier.

18. The method of claim 16, further comprising:
  storing verification information indicating that the stored global identifier has been verified as associated with the local identifier.

19. The method of claim 18, where receiving the local identifier comprises:
  receiving the local identifier in association with a first measurement report; and
  where the handover is a first handover; and
  where the method further comprises:
    receiving the local identifier in association with a second measurement report that is different than the first measurement report;
    determining, based on the verification information, that the stored global identifier has been verified as associated with the local identifier; and
    causing a second handover to the cell based on determining that the stored global identifier has been verified.

20. The method of claim 19, where the first measurement report and the second measurement report are received from one or more user devices to cause the first handover and the second handover to be performed.

* * * * *